July 2, 1968  C. N. FANGMAN  3,390,925
CONNECTING ROD WITH STRAP TYPE CAP
Filed April 19, 1966  3 Sheets-Sheet 3
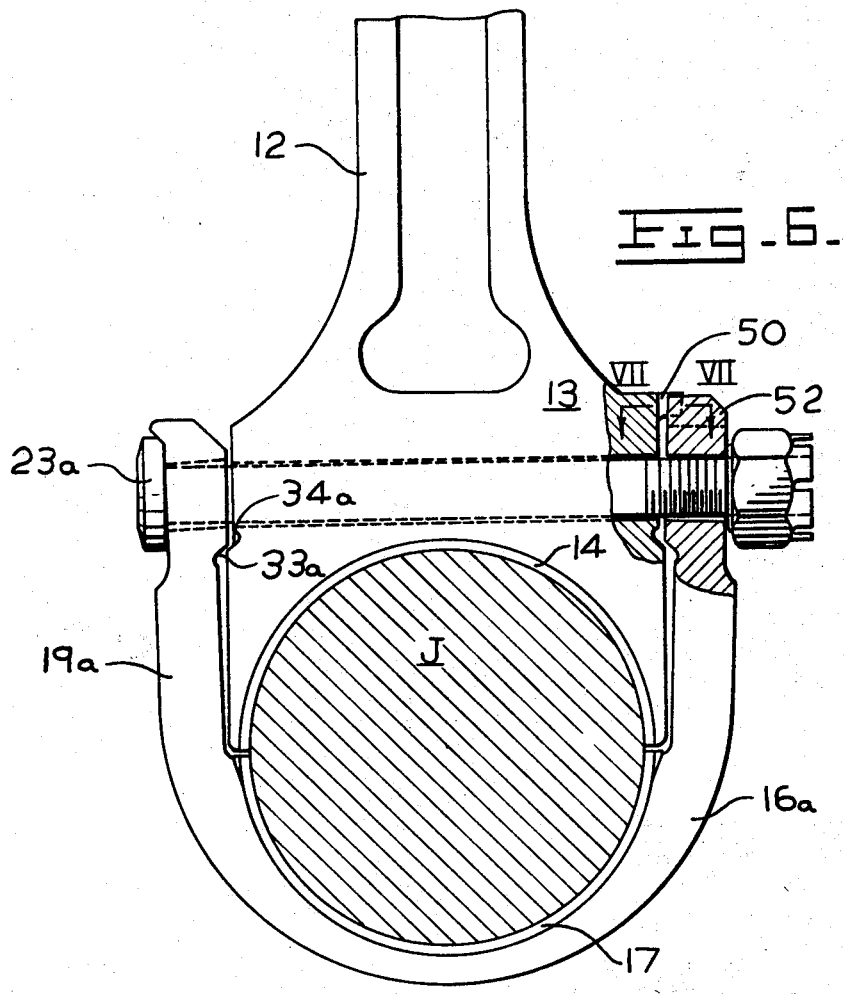
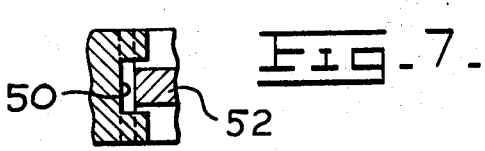
INVENTOR.
CHARLES N. FANGMAN
BY
*Fryer, Zinsmeister, Fisk & Phillips*
ATTORNEYS United States Patent Office 3,390,925
Patented July 2, 1968

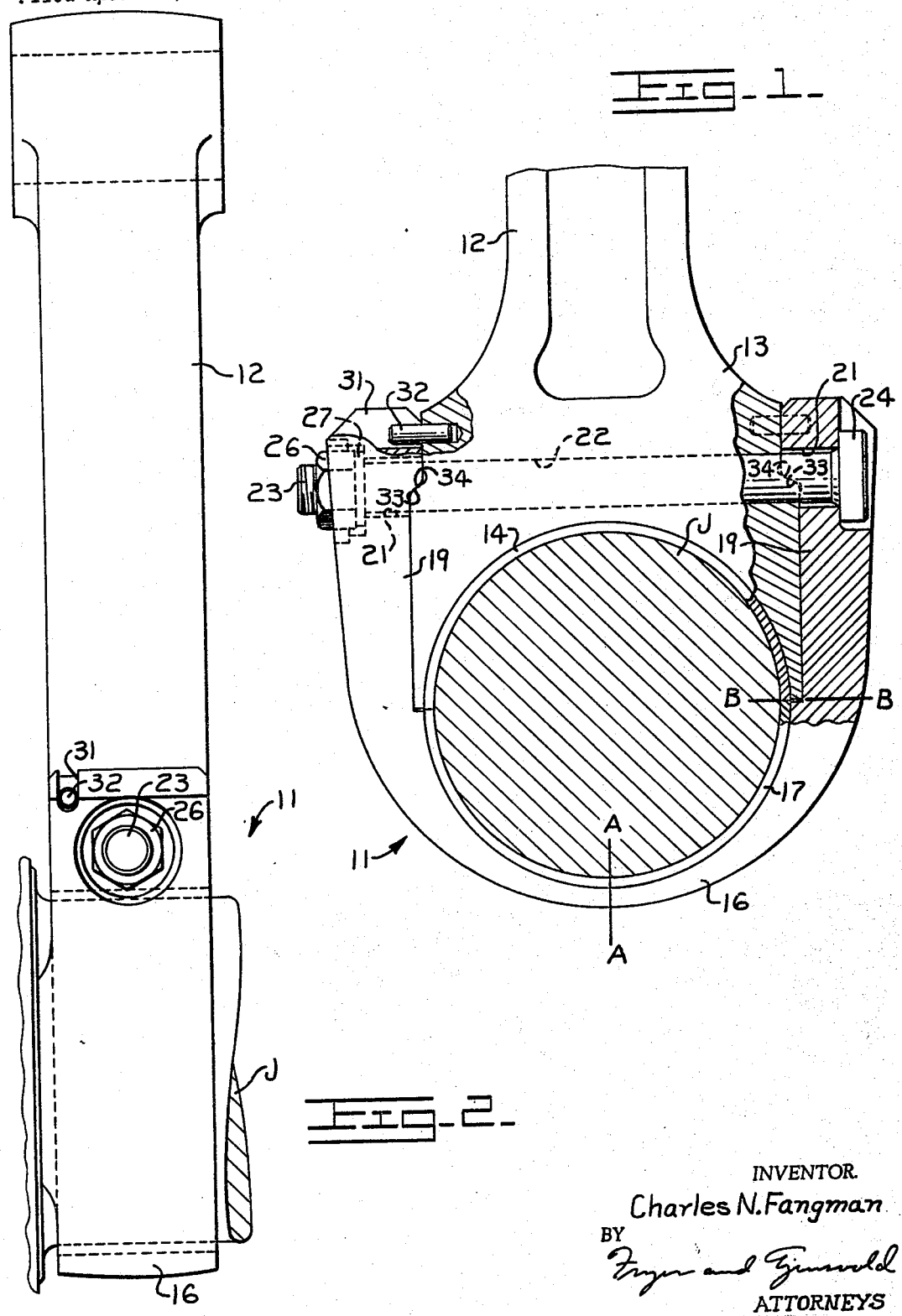

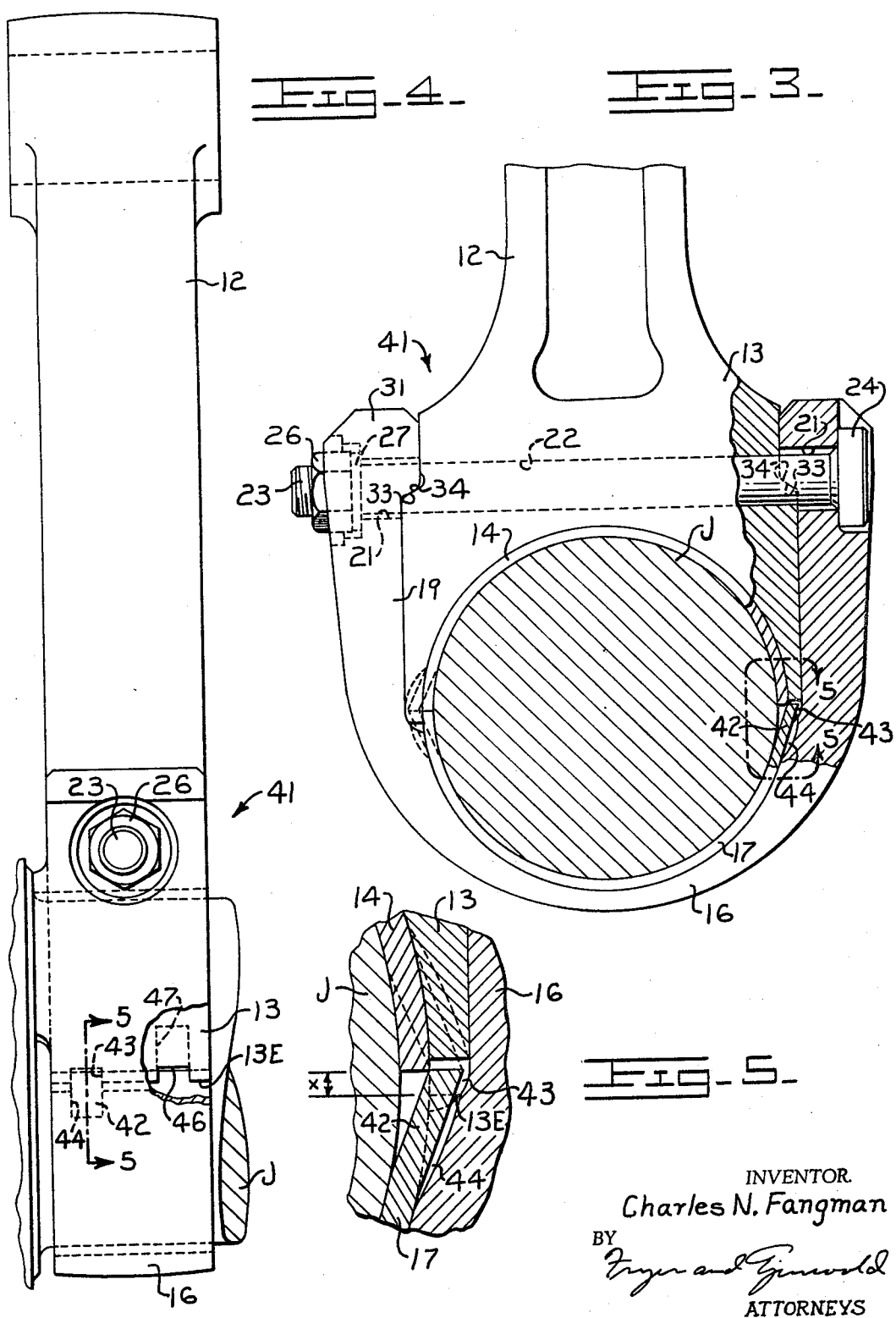

3,390,925
CONNECTING ROD WITH STRAP TYPE CAP
Charles N. Fangman, Peoria, Ill., assignor to Caterpillar Tractor Co., Peoria, Ill., a corporation of California
Continuation-in-part of application Ser. No. 262,946, Mar. 5, 1963. This application Apr. 19, 1966, Ser. No. 549,123
2 Claims. (Cl. 308—15)

ABSTRACT OF THE DISCLOSURE

A connecting rod bearing assembly is provided with a flexible strap type bearing cap having a decreasing cross section toward the center thereof for applying evenly distributed pressure to a lower bearing half shell disposed therein; the assembly is further provided with tab and notch means for accurately aligning and locking both the bearing half shells and for locating the strap in a fixed transverse position on the connecting rod.

---

This application is a continuation-in-part of my assignee's United States Ser. No. 262,946 filed Mar. 5, 1963, now abandoned.

This invention relates to connecting rod bearings and particularly to a flexible strap type bearing cap which has a varying cross section throughout its lower half.

High cylinder pressures in high performance engines require large bearing areas for the connecting rod big end bearings. This requirement has led to large connecting rods and related bearing cap constructions which prevent removal of the pistons from the engine through the top of the block, in the preferred method of disassembling the pistons from the engine. It is an important object of the present invention to keep the big end bearing portion of the connecting rod small enough to permit removal of the piston through the top of the block.

As the bearing areas have been enlarged the weight and mass of the connecting rod and bearing cap assembly have increased. The resulting increase in the inertial loads on the connecting rods becomes particularly significant in four cycle engines during the exhaust stroke. A conventional, rigid connecting rod cap, when machined true and assembled to the crankshaft journal with proper clearance, is limited in the effective bearing area which can be presented to the mating cylindrical surfaces between the rod bearing and journal. The limitation on the effective bearing surface is in the order of approximately 40° of these mating surfaces. It is another object of the present invention to make the connecting cap in the form of a flexible strap which can provide substantially 180° of bearing contact surface between the rod and the crankshaft bearing.

In accordance with the present invention the flexible strap has a cross section that varies from a minimum at the center to a maximum at the end portions of the strap which are engaged with the bearing shell. The flexible strap of the present invention distributes the moment of inertia proportional to the bending moment applied during spreading of the strap in assembly and disassembly and as a result of inertial loads developed during operation. As a result, the strap opens evenly and prevents concentration of a moment arm to eliminate the possibility of putting a permanent set in the strap at any one weak point. Also, as the strap is secured to the rod and drawn upward into operative association with the bearing shell and journal, pressure is distributed evenly about the circumference of the bearing shell to provide the substantially 180° of bearing contact mentioned above. The increased contact area in combination with the substantially uniform distribution of the contact pressure permits the contact pressure to be significantly decreased in comparison to conventional connecting rod bearing cap assemblies now known. The strap of the present invention therefore substantially increases the bearing life. A flexible strap having this construction and effective to function in the manner described constitutes a further object of the present invention.

According to a modified construction of the invention, the upstanding end portions of the flexible strap are of greater lateral extent than the big end bearing portion. Such a modified construction provides a strap that can be assembled and disassembled without the use of special tools since the upstanding ends will tend to spring open when the means for retaining the strap on the big end bearing portion are released.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is an elevation view, partly broken away in section to show details of construction, of a connecting rod and strap type bearing cap assembly constructed in accordance with one embodiment of the present invention;

FIG. 2 is an end elevation view of the connecting rod and bearing cap assembly shown in FIG. 1;

FIG. 3 is an elevation view, partly broken away in section to show details of construction, of a connecting rod and strap type bearing cap assembly constructed in accordance with another embodiment of the present invention;

FIG. 4 is an end elevation view of the connecting rod and bearing cap assembly shown in FIG. 3;

FIG. 5 is a fragmentary enlarged view in section of the portion of the bearing shown encircled by the arrows 5—5 in FIG. 3;

FIG. 6 is an elevation view, partly broken away in section to show details of construction, of a connecting rod and strap type bearing cap assembly constructed in accordance with still another embodiment of the present invention; and, FIG. 7 is a cross-sectional view taken on the line VII—VII of FIG. 6.

In FIGS. 1 and 2 a bearing constructed in accordance with one embodiment of the present invention is indicated generally by the reference numeral 11. The bearing 11 comprises a connecting rod 12 having a big end bearing portion 13 in which an upper bearing half shell 14 is disposed for engagement with the upper surface of the crankshaft journal J.

A bearing cap 16 holds a lower bearing half shell 17 in position against the lower surface of the journal J. In the form of the invention illustrated in FIGS. 1 and 2 the bearing half shells 14 and 17 may, if desired, be bonded to the connecting rod and strap by epoxy resin.

In accordance with the present invention the bearing cap 16 is formed as a flexible strap type cap to exert a substantially uniform pressure about the entire 180° of the journal J encompassed by the lower bearing shell 17. As will be described in greater detail below, this uniform distribution of pressure is achieved through the variation in the cross section between the lowermost, center portion of the strap 16, indicated by the line AA, and the portion adjacent the uppermost end of the bearing shell 17, indicated by the line BB in FIG. 1. The strap 16 includes upstanding end portions 19 which extend alongside the big end bearing portion 13 of the connecting rod. The ends 19 are each formed with a bolt hole 21 which is somewhat oversized to accommodate assembly and the slight vertical movement produced in the strap during assembly. The big end bearing portion 13 is likewise formed with a bolt hole 22. A tie bolt 23 having a bolt head 24 and a nut 26 and washer 27 received in recesses formed in the ends 19 is passed through the strap and connecting rod to clamp the strap in the position illustrated.

Each of the upstanding ends 19 have a slot 31, best shown in FIG. 2, for reception of the dowel pin 32. The dowel pins maintain the strap in a fixed position transversely of the connecting rod. The dowel pins are preferably mounted in line in the big end bearing portion 13 and near one end surface thereof so that the strap 16 is always assembled to the connecting rod in the same manner.

Each of the upstanding ends 19 are formed with inclined surfaces 33 which mate with correspondingly inclined surfaces 34 on the big end bearing portion 13 of the connecting rod. The engagement of these inclined surfaces during tightening of the tie bolt 23 produces a sliding ramp effect which lifts the strap 16 and presses the bearing shell 17 into engagement with the lower surface of the journal J.

The strap type cap of the present invention offers a significant weight reduction as compared to conventional, rigid connecting rod bearing caps. This flexible strap in combination with the manner in which it is attached to the connecting rod by the tie bolt 23 permits the big end bearing portion 13 of the connecting rod to be kept sufficiently small that it can pass through the cylinder in the engine block. Also, the weight saving realized by this construction reduces the inertia loading during the exhaust stroke of operation of a four cycle engine.

The above described variations in the cross section of the strap between locations AA and BB serves an important function. This variation in cross section distributes the moment of inertia of the bearing shell engaging portion of the strap in a manner such that the cross section increases in accordance with the increase in bending moment about this bearing engaging portion of the strap during spreading of the strap on assembly or disassembly. As a result, the strap opens evenly and the possibility of putting a permanent set in the strap at any one weak point is eliminated.

This distribution of the moment of inertia in the bearing shell engaging portion of the strap produces a substantially uniform pressure or bearing crush on the bearing shell when the strap is clamped in position on the big end bearing portion 13 by the action of the tie bolt 23 and inclined mating surfaces 33 and 34. The strap and bearing shell 17 conform to the lower surface of the journal J to provide substantially 180° of surface contact. Inertial loads are thus distributed in a uniform manner over a large area to substantially increase bearing life.

In FIGS. 3 through 5 a bearing constructed in accordance with another embodiment of the present invention is indicated generally by the reference numeral 41. The bearing 41 incorporates a tab construction, best seen in FIGS. 4 and 5, which affords means both for locating or locking the bearing in fixed transverse position in the strap and on the connecting rod and for locating the strap in fixed transverse position on the connecting rod.

The lower bearing shell 17 is formed with an outwardly projecting tab 42 which is received in vertically aligned notches 44 and 43 in the strap 16 and big end portion 13, respectively. In this instance the lowermost edges 13E, see FIG. 4, extend downwardly beyond the center line of the crankshaft pin and juncture of the upper and lower bearing shells by distance X as indicated in FIG. 5 to enable the tab 42 to locate the strap transversely as described.

The upper bearing shell 14 also includes a tab 46 which is inserted in a notch 47 in the big end portion 13 of the connecting rod. The tab 46 is not received within a corresponding notch in the bearing strap since engagement of tab 42 with the side walls of notch 44 is sufficient to maintain alignment of the strap with respect to the big end portion 13.

The above described bearing tab and notch construction insures alignment without auxiliary dowel pins such as pins 32 in the FIG. 1 form of the invention.

The tabs are formed in pairs and are preferably offset as illustrated in FIG. 4 to insure that the bearings and strap were not reversed on the rod during assembly and disassembly.

In FIGS. 6 and 7 another embodiment of the invention is shown wherein the strap 16a has been forged and machined such that in a relaxed or unassembled state the upstanding end portions 19a thereof are spread open and are free from engagement with the big end bearing portion 13. When assembled to the rod 12, the ends 19a are drawn together by the bolt 23a. The ramps 33a and 34a function in the same manner as those previously described with respect to FIG. 1. As best shown in FIG. 7, the embodiment of FIG. 6 has been provided with a slot 50 and tang 52 connection which maintains the strap in a fixed position transversely of the connecting rod.

The modified construction of FIGS. 6 and 7 is especially advantageous in that it provides a strap which can be assembled and disassembled without the use of special tools. Inasmuch as the strap has a spring-like action, it will open automatically to the spread position of FIG. 6 when the retaining bolt 23a is loosened. The variation in cross section between the lowermost, center portion of the strap 16a and the portion thereof adjacent the uppermost end of the bearing shell 17, which causes the strap to close evenly around the lower periphery of the crankshaft journal, is particularly beneficial in this embodiment.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a connecting rod bearing assembly the combination comprising:
   (a) a connecting rod having a big end bearing portion in which an upper bearing half shell is disposed for engagement with the upper surface of a crankshaft journal;
   (b) a flexible strap type cap in which a lower bearing half shell is disposed for engagement with the lower surface of said crankshaft journal;
   (c) said flexible strap having a cross section which decreases toward the center and also having upstanding end portions which, in a relaxed state, tend to assume a position free from engagement with said big end bearing portion;
   (d) a tie bolt which passes through the ends of the flexible strap and big end bearing portion to clamp the strap to the connecting rod;
   (e) said upper and lower bearing shells having tab means respectively received in notch means located on said big end bearing portion and said flexible strap and effective to maintain transverse alignment of said bearing shells with respect to said big end bearing portion and said flexible strap, and at least one of said tab means extending into notch means located on both said big end bearing portion and said flexible strap for locating the strap in fixed tranverse position on the connecting rod.

2. In a connecting rod bearing assembly the combination comprising:

(a) a connecting rod having a big end bearing portion in which an upper bearing half shell is disposed for engagement with the upper surface of a crankshaft journal;
(b) a flexible strap type cap in which a lower bearing half shell is disposed for engagement with the lower surface of said crankshaft journal;
(c) said flexible strap having a cross section which decreases toward the center and also having upstanding end portions which, in a relaxed state, tend to assume a position free from engagement with said big end bearing portion;
(d) a tie bolt which passes through the ends of the flexible strap and big end bearing portion to clamp the strap to the connecting rod;
(e) mating inclined surfaces formed on both the upstanding end portions of said flexible strap and the big end bearing portion for lifting the upstanding ends of the strap on tightening of the tie bolt to press said upper and lower bearing half shells into contact with the journal under an evenly distributed pressure;
(f) said upper bearing half shell having a first tab means which is received in first notch means on said big end bearing portion for locating and accurately aligning said upper bearing half shell within said big end bearing portion;
(g) said lower bearing half shell having second tab means which are received in both a second notch means formed on said flexible strap and a third notch means formed on said big end bearing portion in vertical alignment with said second notch means, said second tab means and second and third notch means providing means both for locating and locking said lower bearing half shell in fixed transverse position in the strap and with respect to said big end bearing portion and for locating the strap in fixed transverse position on the connecting rod.

References Cited

UNITED STATES PATENTS

| | | | |
|---|---|---|---|
| 798,505 | 8/1905 | Gordon | 287—52.02 |
| 830,791 | 9/1906 | Kirchhoff | 287—52.02 |
| 1,009,244 | 11/1911 | Hartsough | 308—67 |
| 1,130,982 | 3/1915 | Kinkead | 308—67 |
| 1,605,742 | 11/1926 | Jordan | 308—237 |
| 1,872,600 | 8/1932 | Manning | 308—237 |
| 1,948,176 | 2/1934 | Hopkins | 308—237 |
| 2,124,803 | 7/1938 | Wollner | 64—17 |
| 2,132,816 | 10/1938 | Wollner | 64—17 |
| 2,428,602 | 10/1947 | Yingling | 308—67 X |
| 2,639,955 | 5/1953 | Tryon | 308—237 |
| 2,741,933 | 4/1956 | Seitz | 74—579 |
| 2,890,598 | 6/1959 | Bensinger | 74—579 |

FOREIGN PATENTS

| | | |
|---|---|---|
| 653,273 | 12/1935 | Germany. |
| 731,730 | 6/1955 | Great Britain. |

MARTIN P. SCHWADRON, *Primary Examiner.*

L. L. JOHNSON, *Assistant Examiner.*